United States Patent [19]
Picardat

[11] 3,864,025
[45] Feb. 4, 1975

[54] DISPLAY INSTRUMENT USING OPTICAL COLLIMATION

[75] Inventor: Bernard Picardat, Paris, France
[73] Assignee: Thomson-CSF, Paris, France
[22] Filed: May 23, 1973
[21] Appl. No.: 363,156

[30] Foreign Application Priority Data
May 26, 1972 France .................. 72.18882

[52] U.S. Cl. .................. 350/174, 356/251
[51] Int. Cl. .......................... G02b 27/10
[58] Field of Search ........ 350/174, 286; 356/251, 356/252

[56] References Cited
UNITED STATES PATENTS
| | | | |
|---|---|---|---|
| 683,203 | 9/1901 | Grubb | 356/251 |
| 1,674,321 | 6/1928 | De Lancey | 350/174 X |
| 2,479,262 | 8/1949 | Richards | 356/251 |
| 2,983,183 | 5/1961 | Pickering | 350/174 X |

Primary Examiner—David H. Rubin
Attorney, Agent, or Firm—Cushman, Darby & Cushman

[57] ABSTRACT

A display instrument using optical collimation for projecting data into the line of sight of an observer, comprising an optical lens which projects images of luminous objects focused at infinity onto a transparent combining glass. The luminous objects corresponding to data be displayed are positioned in the focal zone of the lens. The images are reflected by the glass into the observer's line of sight. A reflectively deflective prism placed in the optical path between the optical zone and the luminous objects, enables the use of an optical lens of greater diameter whereby the operational characteristics of the equipment are improved.

3 Claims, 4 Drawing Figures

DISPLAY INSTRUMENT USING OPTICAL COLLIMATION

The present invention relates to a display instrument using optical collimation and, more particularly, to an aircraft flight data display instrument known as "head-up display" or "collimating head." This instrument enables flight data to be superimposed on the landscape or sky background seen by the pilot. The data appears in the form of luminous marks or symbols. The latter are produced from corresponding luminous objects, such as back-lighted reticles, which are positioned in the focal area of an optical lens. The reticle images are projected at infinity onto the reflective surface of a combining glass positioned in the pilot's normal line of sight. The display is thus superimposed on the landscape and eye accommodation either in distance or brightness is uneccessary. An optical mixer device may be used to combine several reticles into one very elaborate display.

The pilot must have a complete vision of the reticle images without having to move his head uncomfortably or without having to come in very close proximity to the transparent screen through which observation takes place.

The image of the lens in the mirror acts as an optical pupil. The field of the equipment therefore consists, in monocular vision, in the cone centered on the eye and resting upon the optical pupil and, in binocular vision, in the combination of two cones respectively centered on the eyes of the observer and resting upon the optical pupil. In a given direction of vision, the projected images remain visible for movements of either eye over an area corresponding to that of the optical iris.

It is important that the optical pupil be of large diameter in order to increase the comfort of the pilot by enabling him to see easily at a sufficient distance from the transparent display screen.

In practice, any increase in the size of the optical iris generally takes place at the expense of the compactness and size of the equipment. Specifically, the latter which is intended to be fitted above the instrument panel of an aircraft, must be of small dimensions vertically so as in no way to interfere with the external vision or movements of the pilot. In the case of a collimating head which has good optical characteristics and, particularly, which operates without distortion or parallax, the minimum possible height for the housing is dictated by the diameter of the pupil which it is desired to form.

An object of the present invention is to produce an collimating head which overcome these limitations, and in which the size of pupil obtained is greater than the vertical size of the housing, while the optical characteristics of the equipment are unimpaired.

The compactness of such a design is of advantage since it makes fitting possible in various types of cockpits or flight decks, it even being possible to make the fitting retrospectively without special preparation (so-called "retrofitting").

According to the invention, there is provided a display instrument using optical collimation for projecting data into the observer's normal line of sight, said instrument comprising a transparent combining glass positioned in the line of sight and having a surface for reflecting projected images into the said line of sight, an optical objective for projecting images of luminous objects focused at infinity into the said surface and means for providing said luminous objects in the focal zone of said optical objective, wherein a reflectively deflecting prism is located between said optical objective and said means, said prism having an entry face perpendicular to the optical axis which extends to the said focal zone, a reflecting face forming a plane reflecting mirror, and an exit face perpendicular to the optical axis of the optical objective positioned opposite it, the angles of the said prism adjacent to the said exit face having respective values such that the ratio between that formed with the reflecting face and that formed with the entry face is 1:2.

Other and further objects and features of the invention will be more apparent to those skilled in the art upon a consideration of the following description and accompanying drawings in which.

Figure 1:
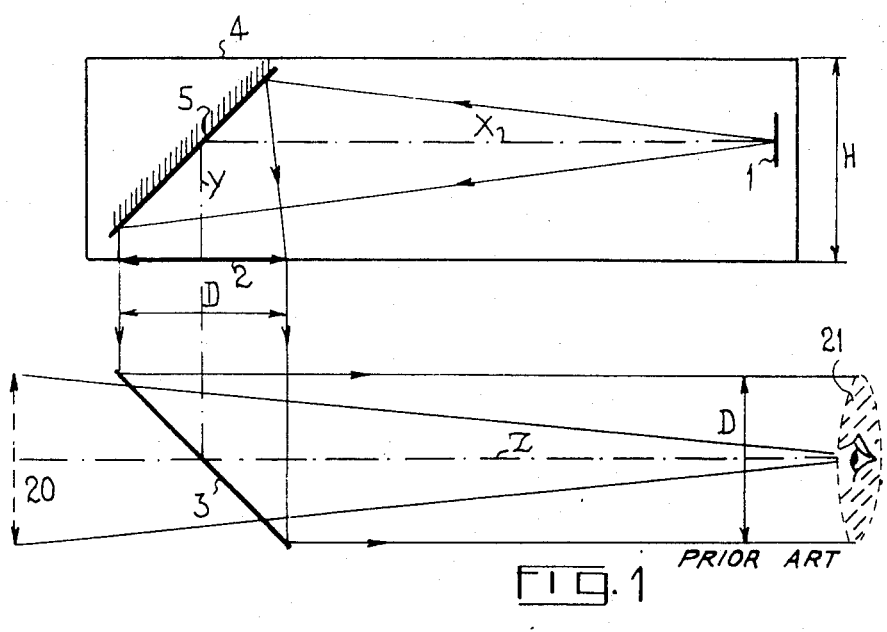
FIG. 1 shows schematically a diagram of a conventional collimating display instrument.

By way of reminder, FIG. 1 shows a diagram of a conventional collimating display instrument. In essence this comprises the following components: luminous objects 1, such as back-lighted reticles, positioned at the focus of an optical lens 2 which may be a bi-convex lens, and a combining glass 3. The reticles 1 and the lens 2 are mounted in a housing 4. The reticle images are focused at infinity by the lens onto the reflective surface of the glass 3 and then reflected into the observer's line of sight. In the version shown, a reflecting mirror 5, inclined at 45° to the optical axis Y of the lens 2 enables the longitudinal axis of the housing to be directed parallel to the direction Z of the optical axis of the lens 2 after reflection on the transparent screen 3 which is assumed to be inclined at 45° also. The setting of the glass 3 is usually adjustable to coincide the direction Z with the normal line of sight of the observer. In the case of either eye and for a given position, the reticle images are visible inside a cone centered on the eye and resting on the optical pupil 20 defined by the image of the lens 2 through the glass 3. In the direction Z visibility is maintained for movements of the eye with and area 21 which corresponds to that of the pupil 20. In the case shown, the diameter of the pupil 20 and the area 21 corresponds to that D of the lens 2.

The vertical size or height H of the housing is necessarily greater than the diameter D of the pupil, mainly in view of the thickness of the lens 2.

Figure 2:
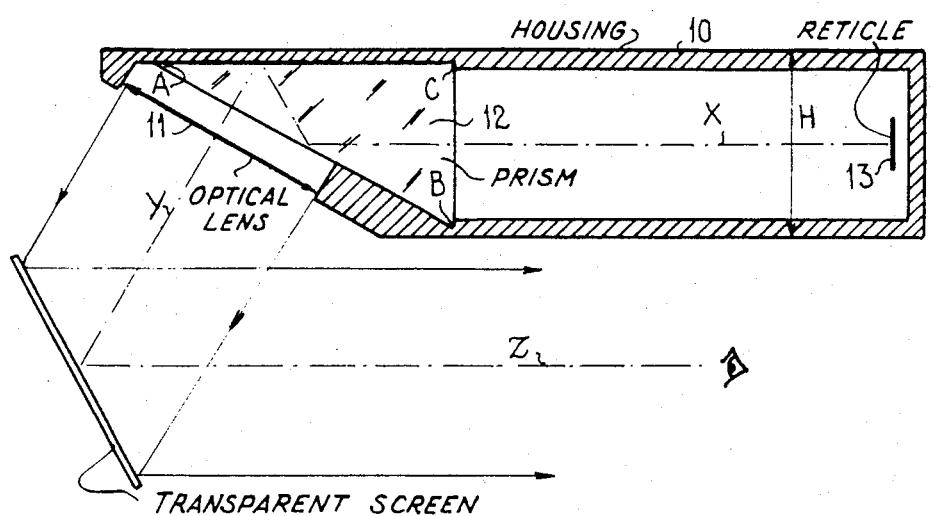
FIG. 2 shows schematically a cross-section of the collimating display instrument and, FIGS. 3 and 4 show diagrams illustrating the equivalent optical path in the prism with which the display instrument is equipped.

FIG. 2. shows schematically a cross-section of the collimating display instrument.

This is composed of a housing 10 which carries an optical exit lens 11, a reflectively deflecting prism 12 and luminous reticles 13 positioned in the focal plane. The prism 12 is inserted in the optical path and is of triangular cross-section. One side BC of the section corresponds to an entry face which is perpendicular to the optical axis X which extends to the focal plane, a second side AC corresponds to a reflecting face which has been treated to form a plane reflecting mirror and the third side AB corresponds to an exit face opposite which the lens 11 is situated. The optical axis Y of the lens 11 is at right angles to the exit face of the prism 12.

Operation is as follows: a light beam issuing from a point source on the reticle is refracted by the entry face of the prism, is then reflected by the exit face, on which it is incident at an angle greater than the limiting angle of incidence, is then reflected by the reflecting face, and is finally refracted by the exit face on which it is now incident at an angle less than the limiting angle of incidence. The beam is collimated by the exit lens 11. The incident angles at which the beams strike the exit face are mainly a result of the choice of the focal length of the lens 11 and the angles of the prism 12.

The angle A of the prism is made equal to half of angle B, so that the optical path in the prism corresponds to passage through a parallel sided plate whose thickness corresponds to the maximum height of triangle ABC, namely that to the apex A, when the plate is formed of the same material as the prism, glass for instance.

Figure 3:
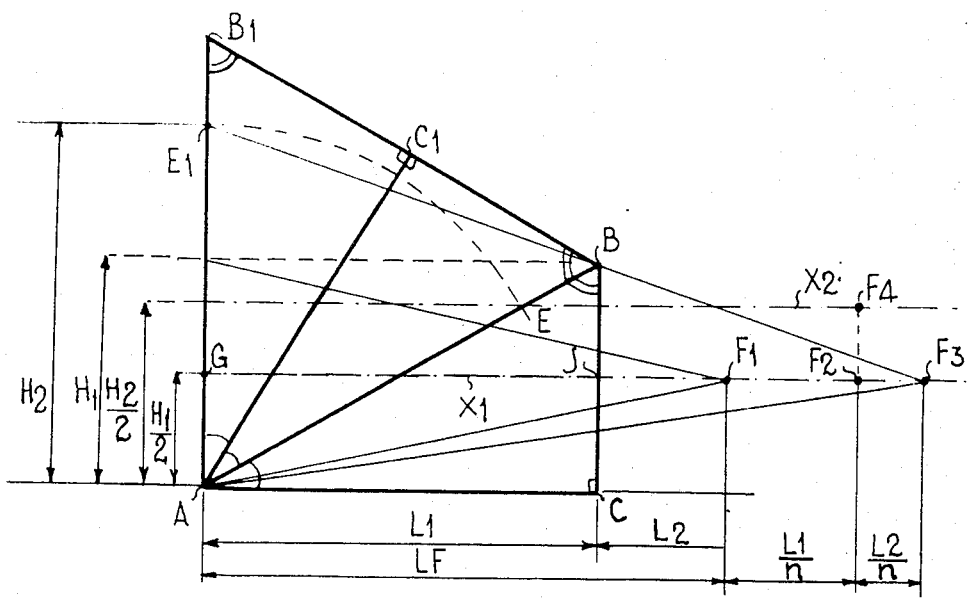

FIG. 3 shows the equivalent optical path. In this example angle C is 90° and an equivalent representation is given of the two successive reflections of the beams by constructing a triangle ABC1 which is symmetrical to ABC about AB and a triangle AB1C1 which is symmetrical to ABC1 about AC1.

With the angular relationship of angle B equalling twice angle A, AB1 is parallel to BC and the optical path in the prism corresponds to passage through a plate whose width L1 is equal to side AC of right-angled triangle ABC.

The increase in the size of the pupil is made clear in FIG. 3. Assuming a pupil of height H1 equal to BC is to be obtained in an air medium from a focus F1 situated at focal length $LF = L1 = L2$, and assuming F3 to be the position of the focus when the optical path is considered totally contained within the medium corresponding to that of the prism, then the pointn F3 is separated from F1 by a complementary distance $L1 = L2/n$, $n$ being the refractive index between the air and the transparent material of which the prism is formed. Comparison between triangles F3JB and F3GE1 shows the increase E1G-BJ in the pupil H2 from point F3 in comparison with pupil H1 is calculated from the relationship $E1G/BJ = F3G/F3J$ which is greater than 1.

Bearing in mind the optical path is partly in air, the displacement of the focus is shown at F2, which is at a distance $L1/n$ from F1, corresponding to passage through a plate equivalent to prism 12.

Figure 4:
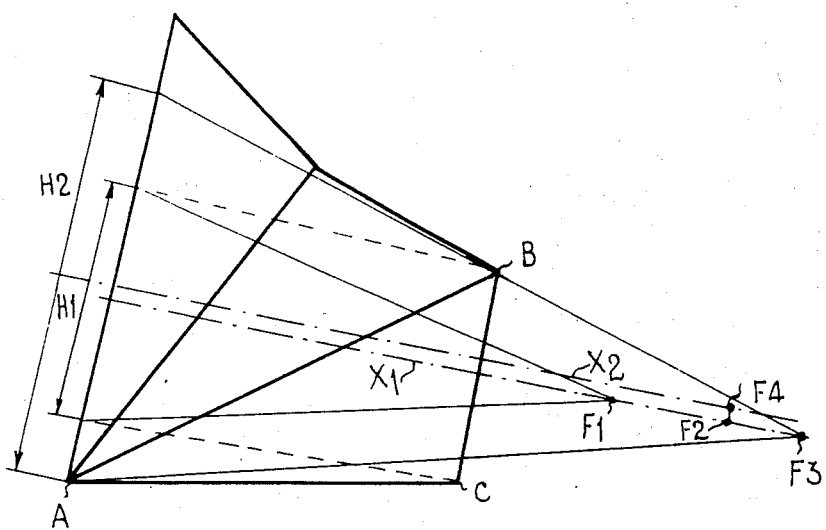

In the case of FIG. 3, the optical axis of the exit lens of diameter H2 is displaced to X2 in relation to the axis X1 considered in the case of the pupil of diameter H1. The focus is produced to F4 on this axis X2 and the reticles will need to be positioned near F2 in the focal plane. The displacement mentioned may particularly be reduced by altering slightly the size of angles A and B, which are 30° and 60° respectively in the example in FIG. 3. Specifically, angle A may be fixed between 25° and 35°. FIG. 4 relates to such an example in which angle A has been selected to be less than 30°.

It must be borne in mind that the exit lens is placed at a short distance from the exit face AB. This distance has been ignored in the description of operation on the basic of FIG. 3 for reasons of simplification. Assuming E1 to be point E transferred to AB (FIG. 3), since the area EB of the exit face is not situated opposite the exit lens, it may be treated to form a reflecting mirror.

The increase in the diameter of the optical pupil may easily amount to 25 to 30 percent. By way of example, for a height of housing H of 60mm and a size H1 of 55mm, the diameter of the pupil may be approximately 70mm, the optical characteristics of the equipment being unimpaired.

What is claimed is:

1. A display instrument using optical collimation for projecting data into the observer's normal line of sight, said instrument comprising:
    a transparent combining glass positioned in said line of sight and having a surface for reflecting projected images into said line of sight;
    an optical objective for projecting images of luminous objects focused at infinity onto said surface;
    means for providing said luminous objects; and
    a reflectively deflecting prism located between said optical objective and said luminous objects providing means, said prism having an entry face for refracting incident light rays issued from said luminous objects; a reflecting face forming a plane reflective mirror and an exit face comprising the largest face of the prism, said exit face being perpendicular to the optical axis of said optical objective which is positioned parallel and opposite said exit face, said luminous objects being positioned in the focal zone of said objective through said prism, said entry face being perpendicular to the optical axis which extends through said prism to said focal zone, the angles of said prism adjacent to said exit face having predetermined values and the ratio of the angle formed with the reflecting face to that formed with the entry face being equal to 1:2 for providing emerging rays which form with the normal to the exit face angles which are respectively the same as those which the corresponding incident rays issued from said objects make with the normal to the entry face, whereby the diameter of the optical objective is greater than the breadth of the entry face and corresponds to the emergent area of said exit face.

2. A display instrument according to claim 1, wherein the value of the angle formed between the exit face and the reflecting face of the prism is from 25° to 35°.

3. A display instrument according to claim 1, wherein the optical objective is placed opposite the exit face in the exit area of the light rays emitted from said means, the said exit area forming a part of the total area of the exit face, the remaining part of the said total area being treated to forom a plane reflecting mirror.

* * * * *